US012679211B2

(12) United States Patent
Grahn

(10) Patent No.: US 12,679,211 B2
(45) Date of Patent: Jul. 14, 2026

(54) VOLTAGE EXTRACTION IN ENERGY STORAGE SYSTEM

(71) Applicant: VOLVO TRUCK CORPORATION, Gothenburg (SE)

(72) Inventor: Pontus Grahn, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 18 days.

(21) Appl. No.: 18/882,428

(22) Filed: Sep. 11, 2024

(65) Prior Publication Data

US 2025/0083526 A1    Mar. 13, 2025

(30)    Foreign Application Priority Data

Sep. 12, 2023    (EP) .................................... 23196924

(51) Int. Cl.
| | |
|---|---|
| *B60L 1/00* | (2006.01) |
| *B60L 58/19* | (2019.01) |
| *H01M 10/42* | (2006.01) |
| *H02J 7/00* | (2026.01) |

(52) U.S. Cl.
CPC ................ *B60L 1/00* (2013.01); *H02J 7/855* (2026.01); *B60L 2210/20* (2013.01); *B60L 2210/30* (2013.01); *B60L 2210/40* (2013.01); *H02J 2207/20* (2020.01)

(58) Field of Classification Search
CPC ............. B60L 2210/20; B60L 2210/30; B60L 2210/40; B60L 2210/42; B60L 2210/12; B60L 1/00; B60L 58/19; B60L 2200/36; H02J 2207/20; H02J 7/0063; H01M 2220/20

USPC .................................................. 307/10.1, 9.1
See application file for complete search history.

(56)    References Cited

U.S. PATENT DOCUMENTS

| | | | |
|---|---|---|---|
| 10,442,309 B2 | 10/2019 | Goetz | |
| 2022/0144104 A1 | 5/2022 | Lasson et al. | |
| 2022/0209546 A1 | 6/2022 | Hall et al. | |
| 2023/0134085 A1* | 5/2023 | Wildgruber ....... | H02M 3/33569 307/9.1 |
| 2024/0278688 A1* | 8/2024 | Despesse ................ | B60L 58/20 |

FOREIGN PATENT DOCUMENTS

| | | |
|---|---|---|
| FR | 3115737 A1 | 5/2022 |
| WO | 2022090558 A1 | 5/2022 |
| WO | 2022240415 A1 | 11/2022 |

OTHER PUBLICATIONS

Extended European Search Report in corresponding European Application No. 23196924.7 dated Feb. 28, 2024 (9 pages).

* cited by examiner

*Primary Examiner* — Rexford N Barnie
*Assistant Examiner* — Swarna N Chowdhuri
(74) *Attorney, Agent, or Firm* — Jeffri A. Kaminski; Venable LLP

(57)    ABSTRACT

A vehicle comprising an ESS is disclosed. The ESS comprises a battery pack with a number of battery cells, at least one connector connected to at least two battery cells connected in series, for providing an output voltage level of qx V which is lower than the maximum traction voltage level of ax V. The ESS may further comprise at least one regulator connected to the at least one connector. The at least one regulator is configured to regulate the output voltage provided by the at least one connector and isolate the low voltage system from the high voltage system in the vehicle.

6 Claims, 4 Drawing Sheets

100

521

| DC to AC | AC to AC | AC to DC |

24 V         24 V

100

140   521   130

510

500

511

VOLTAGE EXTRACTION IN ENERGY STORAGE SYSTEM

TECHNICAL FIELD

The disclosure relates generally to energy storage system (ESS) for an electric vehicle or hybrid electric vehicle. In particular aspects, the disclosure relates to voltage extraction in ESS.

The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

FIG. 1 is schematic block diagram showing an electric vehicle or hybrid electric vehicle 100. Vehicle 100 comprises an ESS 110. ESS 110 used for electric vehicles or hybrid electric vehicles usually consists of battery pack with many battery cells arranged and connected in series and in parallel to achieve required voltage levels and power capacitance. ESS 110 is usually working on high voltage levels, i.e. Traction Voltage (TV) levels with e.g. 600-850 V, and maybe even higher in the future. So ESS 110 is part of a high voltage system 140 in vehicle 100 and provides high voltages, as indicated in FIG. 1. However, the other parts of vehicle 110 e.g. cabin, Electronic Control Units (ECUs) and other auxiliaries are working at low voltage levels e.g. 24 V, which belong to a low voltage system 130 in vehicle 100 as indicated in FIG. 1. In order to get power from ESS 110 for the low voltage system 130, a current solution is using e.g. one or more converters 121, 122 to convert the high voltage from ESS 110 to a low voltage.

FIG. 2 is a schematic diagram showing the principle of conversion from high voltage to low voltage. Firstly, the high direct current (DC) voltage, e.g. 600-850 V from ESS 110 is converted to a high alternating current (AC) voltage e.g. 600-850 V, in a first converter 121 which is a DC-to-AC converter. Secondly, the high AC voltage is transformed to a low AC voltage, e.g. 24 V, by e.g. a transformer 120. In this second step, the high voltage coils, i.e. the primary coils of the transformer 120 are galvanically isolated from the low voltage coils, i.e. the secondary coils, so that the high and low voltage is galvanically isolated from each other. Thirdly, the low AC voltage is converted to a low DC voltage in a second converter 122 which is an AC-to-DC converter. Using converters and transformers working on high voltages takes up space and increases product cost and development cost.

SUMMARY

According to a first aspect of the disclosure, an energy storage system (ESS) for an electric vehicle or hybrid electric vehicle is provided. The ESS comprises a high voltage system including at least one battery pack with a number of battery cells for providing a traction voltage to the vehicle. Each battery cell provides a voltage level of x V and a current capacity of y A. At least two battery cells of the number of battery cells are connected in series and a maximum traction voltage level of ax V is provided by connecting a number a of battery cells in series. The ESS further comprises at least one connector connected between the at least two battery cells connected in series for providing an output voltage level of qx V which is lower than the maximum traction voltage level of ax V, wherein $1 \leq q \leq a-1$. The ESS further comprises at least one regulator connected to the at least one connector and the at least one regulator is configured to regulate the output voltage level of qx V provided by the at least one connector and isolate a low voltage system from the high voltage system in the vehicle.

The first aspect of the disclosure may seek to provide an improved ESS which can extract low voltage from high voltage and provide a stable low voltage for the low voltage system in the vehicle. The regulator for controlling and regulating the low voltage can also be used as the galvanic isolation needed between the high and low voltage system. A technical benefit may include providing the low voltage system with a stable voltage with high isolation between the high and low voltage system, avoiding using high voltage converters, reducing space, product cost and development cost.

Optionally in some examples, including in at least one preferred example, a number b of groups of the series connected battery cells are connected in parallel for providing a current level of by A. A technical benefit of this may include providing a current with a desired level.

Optionally in some examples, including in at least one preferred example, n groups of the series connected battery cells are connected in parallel for providing a current capacity of ny A, wherein $1 \leq n \leq b$, and the at least one connector is connected to the n parallel connected groups of the series connected battery cells. A technical benefit of this may include providing a current with a desired level and the possibility of varying the current depending on applications.

Optionally in some examples, including in at least one preferred example, the at least one regulator comprises a DC-to-AC converter, an AC-to-AC converter and an AC-to-DC converter. The AC-to-AC converter comprises galvanic isolated transformers which isolate the low voltage system from the high voltage system. A technical benefit of this may include providing the low voltage system with a stable voltage and high isolation between the high and low voltage system.

According to a second aspect of the disclosure, a vehicle comprising an ESS as described above is provided.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
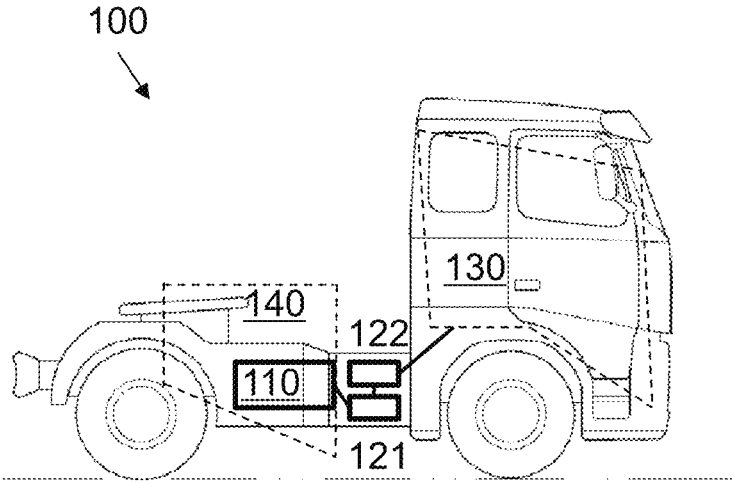
FIG. 1 is a schematic block diagram showing a vehicle according to an example.
Figure 2:
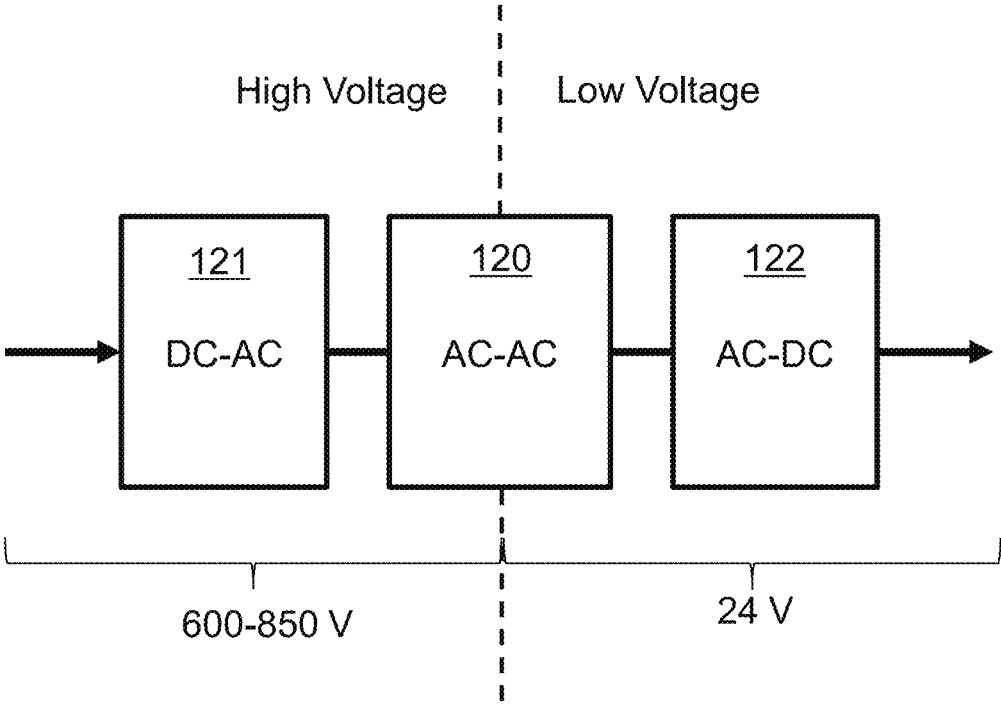
FIG. 2 is a schematic block diagram showing an exemplary converter according to an example.
Figure 3:
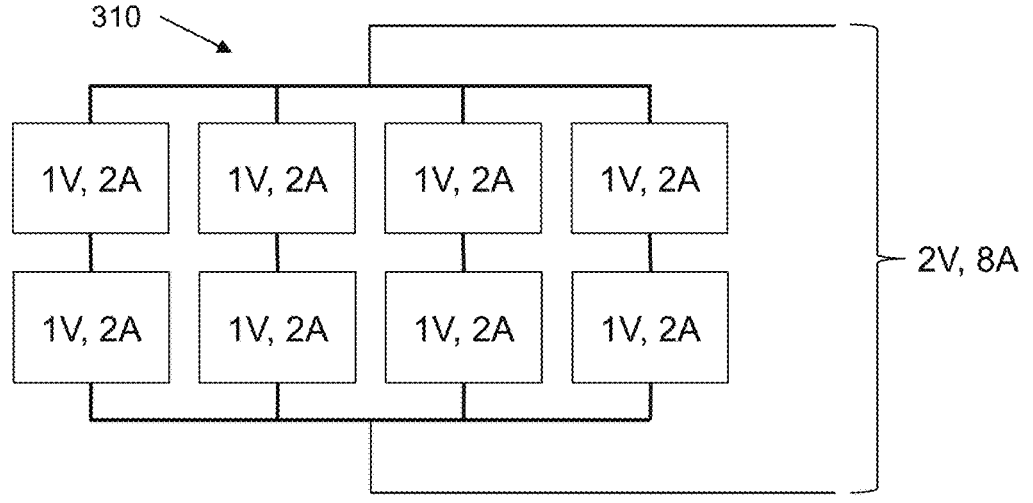
FIG. 3 is a schematic block diagram showing a configuration of battery cells according to an example.

As discussed in the background, ESS 110 works on high voltage levels and is in the high voltage system 140. The low voltage needed for the low voltage system 130 is converted from the high voltage using e.g. one or more converters 121, 122. ESS 110 comprises at least one battery pack with a number of battery cells for providing a traction voltage to vehicle 100. The battery cells are connected in serial to increase voltage and in parallel to increase current. FIG. 3 shows an example battery pack 310 with 8 battery cells, each battery cell provides a voltage level of 1 V and a current capacity of 2 A. If 8 battery cells are connected as shown in FIG. 3, i.e. 2 battery cells are connected in series, then 4 groups of the serially connected battery cells are connected in parallel, then this configuration will provide a voltage level of 2×1=2 V and a current level of 2×4=8 A.

Figure 4:
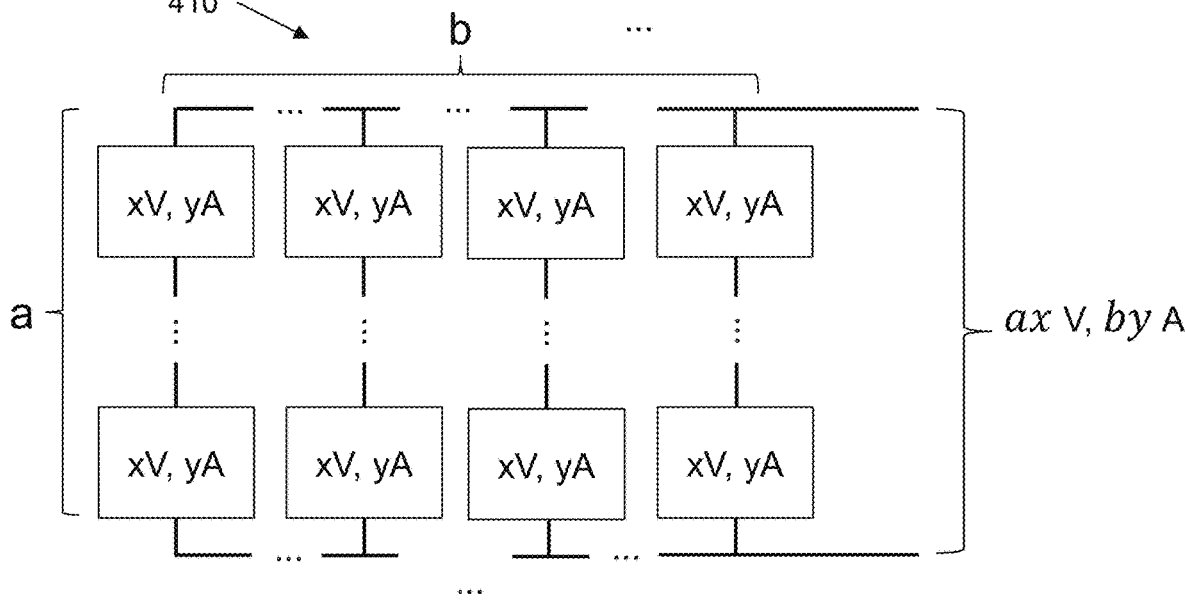
FIG. 4 is a schematic block diagram showing a configuration of battery cells according to an example.

FIG. 4 shows a general example battery pack 410 with a number of battery cells, each battery cell provides a voltage level of x V and a current capacity of y A. A number a of battery cells are connected in series for providing a maximum voltage level of ax V, and a number b of groups of the series connected battery cells are connected in parallel for providing a current level of by A.

Figure 5:
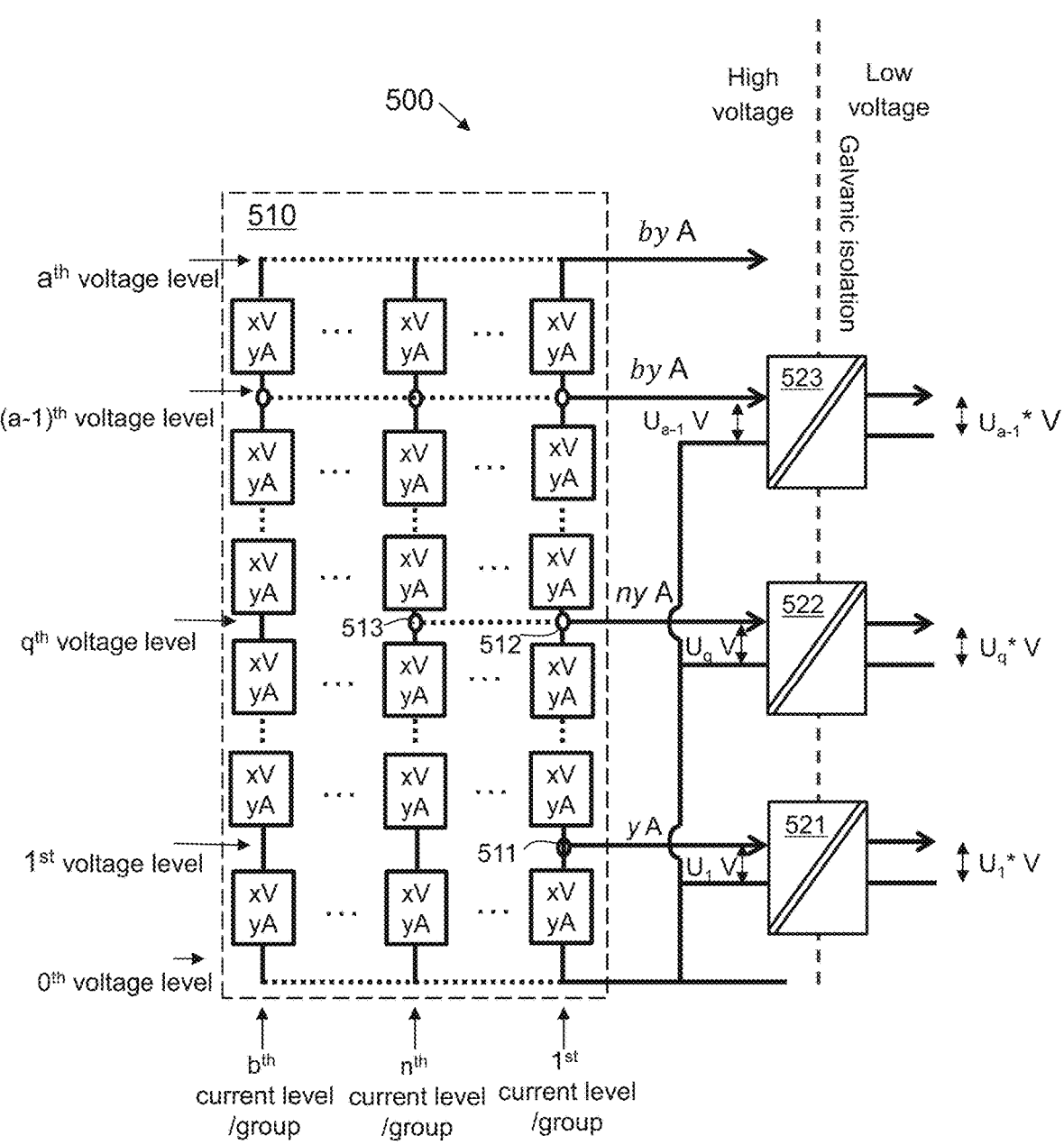
FIG. 5 is a schematic block diagram showing a ESS according to an example.

FIG. 5 is a schematic block diagram of an example ESS 500 according to embodiments herein. ESS 500 comprises a battery pack 510 with a number of battery cells. Each battery cell provides a voltage level of x V and a current capacity of y A. If a number a of battery cells are connected in series, the maximum voltage level can achieve ax V, and there are a voltage levels in this battery package configuration, i.e. $0^{th}$, $1^{st}$, ... $q^{th}$, ... $(a-1)^{th}$, $a^{th}$ voltage levels. If a number b of groups of the series connected battery cells, $1^{st}$, ... $n^{th}$, ... $b^{th}$ group, are connected in parallel, the maximum current level can achieve by A, and there are b current levels in this battery package configuration, $1^{st}$, ... $n^{th}$, ... $b^{th}$ current level.

Therefore, any voltage level, qx V, which is lower than the maximum voltage level of ax V, may be extracted from battery pack 510, where q is defined as:

$$1 \leq q \leq a-1$$

And any current level, ny A, which is lower than the maximum current level of by A, may be extracted from battery pack 510, where n is defined as:

$$1 \leq n \leq b$$

To extract low voltages from battery pack 510, any number of connectors may be placed at different connections between the battery cells to provide desired voltage and current levels. For example, a connector 511 may be placed at the $1^{st}$ voltage level and $1^{st}$ current level, i.e. a connection between a first and second battery cells in the $1^{st}$ group of series connected battery cells, which will provide a voltage level of $U_1$ V, where $U_1$=x, and a current level of y A.

To be general, a number k of connectors, e.g. connectors 512, 513 etc., may be placed at the $q^{th}$ voltage level and $1^{st}$ to $n^{th}$ current levels, i.e. connections between the $q^{th}$ and $(q+1)^{th}$ battery cells in the $1^{st}$ to $n^{th}$ groups of series connected battery cells, which will provide a voltage level of $U_q$ V, where $U_q$=qx, and a current level of ny A.

Note that the extracted voltage is dependent on the battery cells voltage, x, which may vary. One or more regulators 521, 522, 523 may be used at the extracted voltage outputs in order to regulate or control the extracted voltage $U_1$, $U_q$, $U_{a-1}$ and provide a stable controlled voltage $U_1$*, $U_q$*, $U_{a-1}$* for the low voltage system 130. Meanwhile, the regulators 521, 522, 523 can also provide galvanic isolation between the high and low voltage system.

Therefore, according to one example, at least two battery cells in the battery pack 510 are connected in series, and ESS 500 may further comprise at least one connector 511, 512, 513 connected to the at least two battery cells connected in series, for providing an output voltage level of qx V which is lower than the maximum traction voltage level of ax V, wherein $1 \leq q \leq a-1$. ESS 500 may further comprise at least one regulator 521, 522, 523 connected to the at least one connector 511, 512, 513. The at least one regulator 521, 522, 523 is configured to regulate the output voltage level of qx V provided by the at least one connector 511, 512, 513 and isolate the low voltage system 130 from the high voltage system 140 in the vehicle 100.

Note that while the topology is only showing three extracted voltage outputs and regulators, the number of voltage outputs and regulators, R, may be:

$$1 \leq R \leq (a-1)b$$

For example, the traction voltage in a vehicle may be higher than 450 V, the extracted output voltage of the at least one connector 511, 512, 513 may be provided to the low voltage system 130 with a nominal voltage in the range of e.g. 9-18 V, or 18-36 V, or 36-60 V etc. The ESS 500 may comprise two or more connectors 511, 512, 513, and the extracted output voltages of the two or more connectors 511, 512, 513 may be provided to two or more low voltage systems 130 with different voltage ranges respectively.

Figures 6, 7:
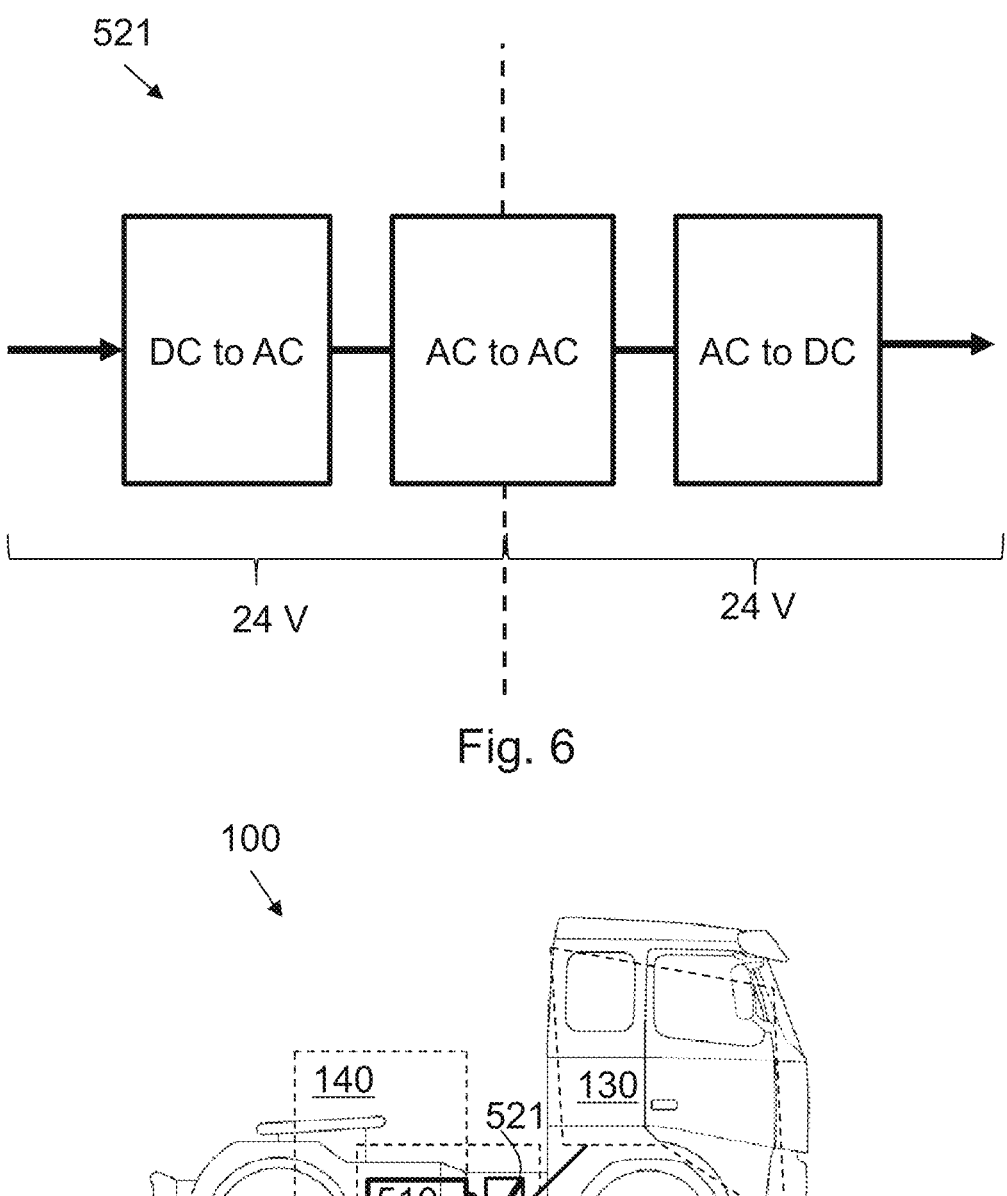
FIG. 6 is a schematic block diagram showing an exemplary regulator according to an example.
FIG. 7 is a schematic block diagram showing a vehicle according to an example.

FIG. 6 shows an example of the regulator 521, 522, 523. The regulator 521, 522, 523 may comprise a DC-to-AC converter which converts the extracted low DC voltage, e.g. 24 V, to a low AC voltage, e.g. 24 V. The regulator 521, 522, 523 may comprise an AC-to-AC converter which may comprise a galvanic isolated transformer to isolate the low voltage system 130 from the high voltage system 140. In a galvanic isolated transformer, the primary coils are galvanic isolated from the secondary coils so that the system coupled at the secondary coils side can be isolated from the system coupled at the primary coils side. The AC-to-AC converter in the regulator 521, 522, 523 may convert the low AC voltage, e.g. 24V from the DC-to-AC converter to the same low AC voltage as that from the DC-to-AC converter, i.e. 24 V or to a lower AC voltage than that from the DC-to-AC converter. In any cases, both the primary and secondary coils are working at low voltages. The regulator 521, 522, 523 may further comprise an AC-to-DC converter which converts the low AC voltage, e.g. 24 V from the AC-to-AC converter to a low DC voltage, e.g. 24 V, to be provided to the low voltage system 130. As can be seen, the DC-to-AC converter, AC-to-AC converter and AC-to-DC converter all work at low voltages, which make it easy to develop and be implemented with reduced size and cost compared to the respective converters working at high voltages.

FIG. 7 is a schematic diagram showing a vehicle 100 in which the disclosure may be implemented. The vehicle 100 comprises an ESS 500 as described above. The ESS 500 comprises a battery pack 510 with a number of battery cells, at least one connector 511 connected to the at least two battery cells connected in series, for providing an output voltage level of qx V which is lower than the maximum traction voltage level of ax V. The ESS 500 may further comprise at least one regulator 521 connected to the at least one connector 511. The at least one regulator 521 is configured to regulate the output voltage level of qx V provided by the at least one connector 511 and isolate the low voltage system 130 from the high voltage system 140 in the vehicle 100.

To summarize, the ESS 500 disclosed herein can extract one or more lower voltage levels from the high voltage system and provide one or more stable low voltages for the low voltage system in the vehicle 100. One or more connectors may be placed between the battery cells to output desired low voltage levels. One or more regulators for controlling and regulating the extracted low voltages can be used to provide stable low voltages, and meanwhile, the regulators can also work as the galvanic isolation needed between the high and low voltage system. In this way, high voltage converters can be avoided. As a result, space, product cost and development cost can be reduced. The ESS 500 may also provide various low voltage levels with various current levels depending on applications.

The disclosure can be applied in any type of vehicles such as wagons, motor vehicles e.g. motorcycles, cars, trucks, buses, railed vehicles e.g. trains, trams, watercraft e.g. ships, boats, amphibious vehicles e.g. screw-propelled vehicle, hovercraft, aircraft e.g. airplanes, helicopters, aerostat and spacecraft etc.

Various examples are listed in the following.

Example 1: An energy storage system, ESS 500, for an electric vehicle or hybrid electric vehicle 100, wherein the ESS 500 comprises a high voltage system 140 including at least one battery pack 110, 510 with a number of battery cells for providing a traction voltage to the vehicle 100, wherein each battery cell provides a voltage level of x V and a current capacity of y A, at least two battery cells in the battery pack 110, 510 are connected in series, and the battery pack 110, 510 provides a maximum traction voltage level of ax V by connecting a number a of battery cells in series, wherein the ESS 500 further comprises:

at least one connector 511, 512, 513 connected between the at least two battery cells connected in series, for providing an output voltage level of qx V which is lower than the maximum traction voltage level of ax V, wherein $1 \leq q \leq a-1$; and at least one regulator 521, 522, 523 connected to the at least one connector 511, 512, 513, wherein the at least one regulator 521, 522, 523 is configured to regulate the output voltage provided by the at least one connector 511, 512, 513 and isolate a low voltage system 130 from the high voltage system 140 in the vehicle 100.

Example 2: The ESS 500 according to Example 1, wherein a number b of groups of the series connected battery cells are connected in parallel for providing a current level of by A.

Example 3: The ESS 500 according to Example 2, wherein n groups of the series connected battery cells are connected in parallel for providing a current capacity of ny A, wherein $1 \leq n \leq b$, and the at least one connector 511, 512, 513 is connected to the n parallel connected groups of the series connected battery cells.

Example 4: The ESS 500 according to any one of Examples 1-3, wherein the at least one regulator 521, 522, 523 comprises a DC-to-AC converter, an AC-to-AC converter and an AC-to-DC converter, and wherein the AC-to-AC converter comprises a galvanic isolated transformer which isolates the low voltage system 130 from the high voltage system 140.

Example 5: The ESS 500 according to any one of Examples 1-4, wherein the traction voltage is higher than 450 V and the output voltage of the at least one connector (511, 512, 513) is provided to the low voltage system (130) with a nominal voltage in the range of 9-18 V.

Example 6: The ESS 500 according to any one of Examples 1-4, wherein the traction voltage is higher than 450 V and the output voltage of the at least one connector (511, 512, 513) is provided to the low voltage system (130) with a nominal voltage in the range of 18-36 V.

Example 7: The ESS 500 according to any one of Examples 1-4, wherein the traction voltage is higher than 450 V and the output voltage of the at least one connector (511, 512, 513) is provided to the low voltage system (130) with a nominal voltage in the range of 36-60 V.

Example 8: The ESS 500 according to any one of Examples 1-4, wherein the ESS 500 comprises two or more connectors 511, 512, 513, the traction voltage is higher than 450 V and the output voltages of the two or more connectors 511, 512, 513 are provided to two or more low voltage systems 130 with different voltage ranges respectively.

Example 9: An electric vehicle or hybrid electric vehicle 100 comprising an EES system 500 according to any one of Examples 1-8.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. An energy storage system, ESS, for an electric vehicle or hybrid electric vehicle, wherein the ESS comprises;

at least one battery pack with a number of battery cells, wherein each battery cell provides a voltage level of x V and a current capacity of y A, and wherein a number a of battery cells are connected in series to provide a maximum traction voltage level of ax V for a high voltage system comprised in the vehicle and the number a of voltage levels, where a>3 and a number b of groups of the series connected battery cells are connected in parallel for providing a maximum current level of by A and the number b of current levels, wherein the ESS further comprises: two or more connectors, wherein at least one connector is connected between the $q^{th}$ and $(q+1)^{th}$ battery cells in the $1^{st}$ to $n^{th}$ groups of series connected battery cells for providing an output voltage level of qx V which is lower than the maximum traction voltage level of ax V and a current capacity of ny A, wherein 1<q<a−1, 1<n<b; and at least one regulator is directly connected to the at least one connector, wherein the at least one regulator is configured to regulate the output voltage provided by the at least one connector and provide the regulated voltage to a low voltage system comprised in the vehicle and isolate the low voltage system from the high voltage system in the vehicle; wherein the at least one regulator comprises a DC-to-AC converter, an AC-to-AC converter and an AC-to-DC converter, and wherein the AC-to-AC converter comprises a galvanic isolated transformer which isolates the low voltage system from the high voltage system.

2. The ESS according to claim 1, wherein the traction voltage is higher than 450 V and the output voltage of the at least one connector is provided to the low voltage system with a nominal voltage in the range of 9-18 V.

3. The ESS according to claim 1, wherein the traction voltage is higher than 450 V and the output voltage of the at least one connector is provided to the low voltage system with a nominal voltage in the range of 18-36 V.

4. The ESS according to claim 1, wherein the traction voltage is higher than 450 V and the output voltage of the at least one connector is provided to the low voltage system with a nominal voltage in the range of 36-60 V.

5. The ESS according to claim 1, wherein the traction voltage is higher than 450 V and the output voltages of the two or more connectors are provided to two or more low voltage systems with different voltage ranges respectively.

6. An electric vehicle or hybrid electric vehicle comprising an ESS system according to claim 1.

* * * * *